(12) United States Patent
Sutton et al.

(10) Patent No.: US 10,691,631 B2
(45) Date of Patent: Jun. 23, 2020

(54) BROADCAST BUS FRAME FILTER

(71) Applicant: Mercury Systems Inc., Chelmsford, MA (US)

(72) Inventors: Brian M. Sutton, West Lafayette, IN (US); Scott D. Miller, Lafayette, IN (US)

(73) Assignee: Mercury Systems, Inc., Chelmsford, MA (US)

( * ) Notice: Subject to any disclaimer, the term of this patent is extended or adjusted under 35 U.S.C. 154(b) by 16 days.

(21) Appl. No.: 15/351,244

(22) Filed: Nov. 14, 2016

(65) Prior Publication Data

US 2018/0060267 A1 Mar. 1, 2018

Related U.S. Application Data

(60) Provisional application No. 62/254,490, filed on Nov. 12, 2015.

(51) Int. Cl.
| | |
|---|---|
| *G06F 13/42* | (2006.01) |
| *H04L 29/06* | (2006.01) |
| *H04L 12/40* | (2006.01) |
| *H04L 29/08* | (2006.01) |

(52) U.S. Cl.
CPC .... *G06F 13/4208* (2013.01); *H04L 12/40013* (2013.01); *H04L 12/40032* (2013.01); *H04L 63/0245* (2013.01); *H04L 67/12* (2013.01); *H04L 2012/40215* (2013.01); *H04L 2012/40273* (2013.01)

(58) Field of Classification Search
CPC ........... G06F 13/4208; H04L 12/40013; H04L 12/40032; H04L 63/0245; H04L 67/12; H04L 2012/40215; H04L 2012/40273
See application file for complete search history.

(56) References Cited

U.S. PATENT DOCUMENTS

| | | | | |
|---|---|---|---|---|
| 5,179,552 A | * | 1/1993 | Chao | ........................ H04J 3/247 370/352 |
| 2006/0253903 A1 | * | 11/2006 | Krumel | ............... H04L 63/0227 726/13 |

(Continued)

FOREIGN PATENT DOCUMENTS

WO 2015081969 6/2015

OTHER PUBLICATIONS

Notification of Transmittal of the International Search Report and the Written Opinion of the International Searching Authority, or Declaration dated Feb. 23, 2017, by the European Patent Office.

(Continued)

*Primary Examiner* — Eric T Oberly

(57) ABSTRACT

Various communication systems may benefit from appropriate filtering of communications. For example, a network having a broadcast bus, such as a controller area network, may benefit from a frame filter. For example, a method can include receiving a plurality of messages at an interface with a broadcast bus of a communication network for a system. The method can also include selectively permitting the plurality of messages to be conveyed through the interface based on comparing one or more of the plurality of messages to a specification for the interface.

29 Claims, 12 Drawing Sheets

(56) References Cited

U.S. PATENT DOCUMENTS

| | | | | |
|---|---|---|---|---|
| 2008/0274689 A1* | 11/2008 | Kuban | ............... | H04L 1/16 |
| | | | | 455/7 |
| 2014/0032800 A1* | 1/2014 | Peirce | ............... | H04L 67/12 |
| | | | | 710/105 |
| 2015/0020152 A1* | 1/2015 | Litichever | ............... | H04L 63/14 |
| | | | | 726/1 |
| 2015/0191136 A1* | 7/2015 | Ben Noon | ............ | B60R 16/023 |
| | | | | 726/23 |

OTHER PUBLICATIONS

International Preliminary Report on Patentability dated May 24, 2018, by The International Bureau of WIPO for related international patent application PCT/US2016/061909.

* cited by examiner

BROADCAST BUS FRAME FILTER

CROSS REFERENCE TO RELATED APPLICATIONS

This application claims priority to U.S. Provisional Patent Application Ser. No. 62/254,490 filed Nov. 12, 2015, titled, "BROADCAST BUS FRAME FILTER," the disclosure of which is fully incorporated herein by reference for all purposes.

BACKGROUND

Field

Various communication systems may benefit from appropriate filtering of communications. For example, a network having a broadcast bus, such as a controller area network, may benefit from a filter, such as a frame filter.

Description of the Related Art

Controller area network (CAN) based systems are used in a wide-range of applications and market segments. Some of these segments include the automotive industry, industrial equipment, and military systems. When these systems are interconnected, cyberattacks may potentially compromise these systems leading to financial loss or even safety concerns.

For example, in July 2015, security researchers were able to remotely disable a vehicle on a highway using a cyberattack against a vulnerable cellular-network enabled electronic control unit (ECU) attached to the vehicle's CAN bus. A successful cyberattack against an ECU can yield complete control of the ECU to the cyber-actor. If an adversary is able to gain control of a device that is connected to a CAN bus, that adversary may be able to inject any valid CAN message on the bus and thereby control many aspects of the vehicle, for example, by forging messages from sensors and/or other controllers. It may even be possible to disable the brakes of a vehicle remotely using such an attack.

In CAN bus systems, any device can influence the data on the bus at any time due to the shared nature of the differential bus. For example, any device can pull the bus low effectively forcing a dominant state. As a result, identification of the originator of a message may be a significant challenge, even when observing the signals on the bus during arbitration, under normal operation without any misbehaving devices. Without knowledge of what device is in control of the bus, prevention of an unauthorized ECU from sending an otherwise valid CAN message can be difficult. For example, a transmission ECU in a vehicle network might legitimately send an "engine-speed" message. If such a message is instead produced by the vehicle infotainment system, it may be highly suspicious.

Because the CAN architecture hides the originator of a message, a compromised ECU can pretend to be any other device on the bus. A compromised ECU can perform many potentially unwanted actions. For example, a compromised ECU may flood the bus with high-priority messages to prevent legitimate device traffic, resulting in a denial-of-service attack. Additionally, a compromised ECU can provide malicious software updates to other ECUs on the bus.

There are a number of approaches being pursued to address the security challenges faced by vehicles as a result of their use of the CAN bus. These approaches include replacing the underlying bus technology with an alternative technology such as Ethernet or other vehicle buses.

Another alternative is the use of CAN bus monitors and other tools to actively track the messages and that are being sent on the CAN bus. This approach may allow someone to identify if invalid messages are being sent, such as messages not within the specification, or if valid messages are being sent with incorrect timing, which may violate the specification. A CAN bus monitor may also act in a manner analogous to anti-virus software, which seeks to detect suspicious activity by monitoring for patterns of messages similar to those used in prior attacks.

A CAN bus monitor may unfortunately be unable to distinguish legal messages sent from an approved ECU from legal messages sent from a compromised ECU. That is, the monitor may be unable to determine which ECU is actually communicating. If the monitor sees the message, "shift into reverse," the monitor may not be able to determine whether the sender was the legitimate transmission controller, or whether it was a compromised infotainment system, for example.

Additionally, a complete specification of all messages that can exist on the CAN bus at any time may require contribution of technical data, which may be proprietary, from several independent and competing ECU manufacturers, making the construction of such a specification difficult. In the alternate case wherein a CAN bus monitor acts in a manner analogous to anti-virus software, it must be supported by a forensic analysis capability that produces the patterns for recognizing suspicious activity as new attacks are developed, entailing an ongoing effort and cost. Moreover, a CAN bus monitor may only be able to stop a message by generating global bus errors that affect every ECU in the system; such errors can cause the setting of persistent state in some CAN devices, leading to consequences such as triggering a persistent dash-board display to notify the driver that the vehicle requires maintenance.

Many of the vulnerabilities for CAN connected ECUs involve a compromise of the software running on these systems. Properly implemented software may prevent an adversary from exploiting the ECU from a networked attack. However, software-based solutions may themselves be vulnerable to exploits as observed throughout the history of software on personal computers.

There are a number of proposals that seek to secure embedded bus architectures using cryptography to secure the communications on the internal buses. This approach may ensure that only authorized ECUs, i.e., those bearing proper cryptographic credentials, are allowed to connect to the bus and that an eavesdropper cannot understand the bus traffic. However, this may not be effective against a compromised ECU, such as can result from a cyberattack, since the compromised ECU may retain its credentials, and may therefore be able to decrypt messages on the bus, and/or provide properly encrypted spurious messages onto the bus.

A similar credentials-based approach is the use of gateway firewalls within the vehicle network, which segment the bus and serve as guards for each segment. In this approach, the ECUs must authenticate with the gateway in order for their traffic to be bridged between bus units, thereby limiting the impact of a compromised ECU to a single bus segment. However, as with the bus-encryption approach, if an ECU is compromised, it may still retain its authentication credentials.

In a universal serial bus (USB) based architecture, the communication bus can be structured in a "tiered-star" or heterogeneous "tree-shaped" topology with the root of the tree representing the "host machine," the branch-points of the tree representing USB hubs, and the leaves of the tree representing individual USB devices. In this architecture, all devices logically connect to the host machine which can, in turn, make decisions about permitting/denying connectivity to each device. That is, the bus of the USB architecture can facilitate multiple logical point-to-point master-slave connections, where the host device plays the role of "master." In the USB architecture there is a single master device, as opposed to a CAN bus which is known as a multi-master bus.

FIG. 1 illustrates a variety of network topologies. The topology of a communications bus like CAN may be very different from a tree based topology like USB. In the CAN bus based topology, every connected device may communicate with all other connected devices: each device may see all traffic on the bus regardless of originator or intended destination. Thus, such a bus topology may be a fully peer-to-peer topology. In a tiered star approach used by USB, the slave devices may communicate only with the root node or host machine. In direct contrast to a CAN bus topology, tiered-star networks may not permit communication paths between leaf devices. As shown in FIG. 1, in addition to bus 170, which is arranged as in the CAN bus topology, there are also a variety of other possible topologies for interconnecting devices, such as a ring 110, mesh 120, line 130, star 140, tree 150, or fully-connected architecture 160. Some of these other topologies may be implemented in ways that are logically equivalent to a physical CAN bus topology. Accordingly, references herein to a bus topology should be understood to refer to the logical topology, unless otherwise stated. The use of one or more physical buses is permitted, but not absolutely necessary for such a topology.

For example, certain architectures may include CAN repeaters that transparently repeat traffic on multiple physical bus segments to produce a system-level behavior equivalent to a contiguous CAN bus. Moreover, certain devices may include physical interfaces that receive digital signals from a CAN controller and map them to the physical signaling of CAN.

As used herein, a broadcast bus can refer to an architecture in which multiple devices on a bus share common wires and can all talk simultaneously on the bus. Any message sent by one device can be seen by all devices. In such an architecture, arbitration may need to occur if multiple devices begin communication at the same time.

A broadcast bus can contrast with the architecture of a universal serial bus (USB). The USB architecture is a tree architecture, despite the term "bus" being used in its name. Only the master device can initiate data transfer on the USB, i.e. a USB slave device can not transfer any data on the bus without an explicit request from the host controller.

SUMMARY

According to certain embodiments, a method can include receiving a plurality of messages at an interface with a broadcast bus of a communication network for a system. The method can also include selectively permitting the plurality of messages to be conveyed through the interface based on comparing one or more of the plurality of messages to a specification for the interface.

An apparatus, according to certain embodiments, can include a receiver configured to receive a plurality of messages at an interface with a provided broadcast bus of a provided communication network for a provided system. The apparatus can also include a processor configured to perform a comparison of one or more of the plurality of messages to a specification for the interface. The apparatus can further include a transmitter configured to selectively forward the plurality of messages through the interface based on the comparison.

In certain embodiments, an apparatus can include means for receiving a plurality of messages at an interface with a broadcast bus of a communication network for a system. The apparatus can also include means for selectively permitting the plurality of messages to be conveyed through the interface based on comparing one or more of the plurality of messages to a specification for the interface.

A non-transitory computer-readable medium can, in certain embodiments, be encoded with instructions that, when executed in hardware, perform a process. The process can include receiving a plurality of messages at an interface with a broadcast bus of a communication network for a system. The process can also include selectively permitting the plurality of messages to be conveyed through the interface based on comparing one or more of the plurality of messages to a specification for the interface.

BRIEF DESCRIPTION OF THE DRAWINGS

For proper understanding of the invention, reference should be made to the accompanying drawings, wherein.

DETAILED DESCRIPTION

Figure 1:
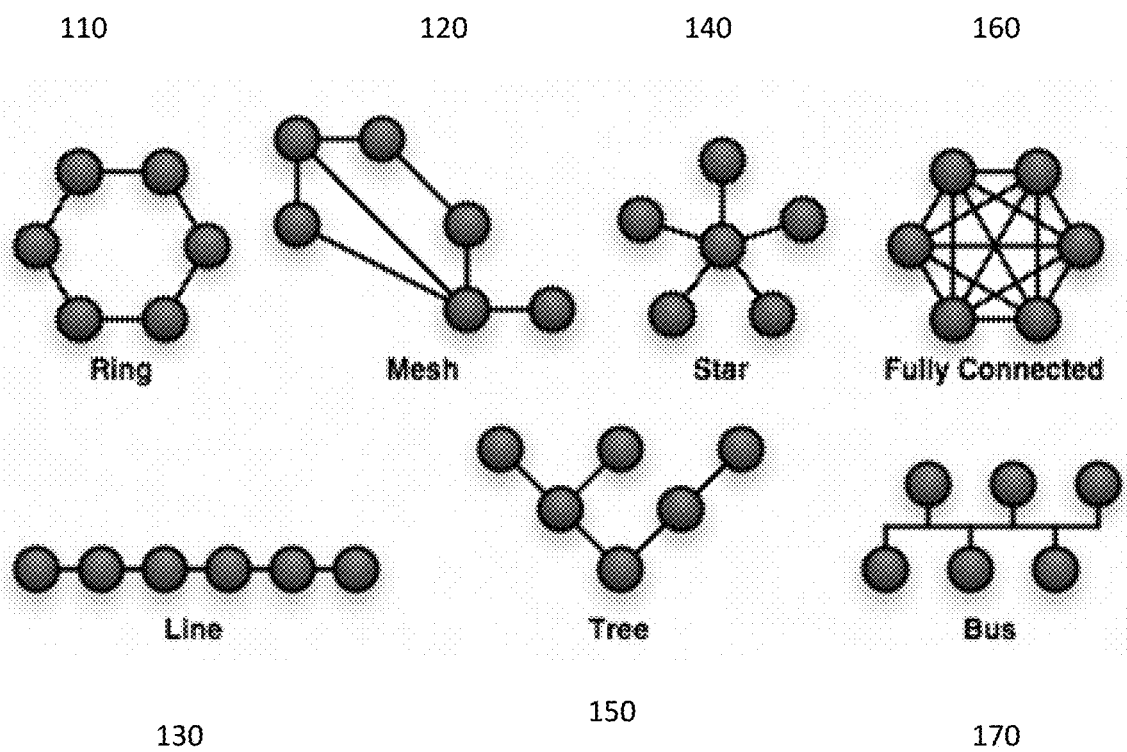
FIG. 1 illustrates a variety of network topologies.

To help solve cybersecurity issues for network-connected CAN-based systems or for other purposes, a system may be designed to prevent the cyberattack, or to prevent a compromised ECU from having arbitrary access to the CAN bus. A filter according to certain embodiments can provide an isolated hardware based selective filter for traffic from an originating ECU. Here, isolated is used to mean that the filter is independent from the primary operation of the ECU, and maintains an independent security boundary such that a compromise of the filtered ECU's core functionality does not compromise the filter. This isolated hardware-based filtering architecture may prevent a compromised ECU from sending messages that the ECU is not expected/allowed to send. The filter can be applicable to any system that uses a CAN bus including, but not limited to, automotive, military, and industrial systems. While a CAN bus is provided as an example of a broadcast bus, certain embodiments may also be applicable to other bus types.

International organization for standards (ISO) 11898-1: 2003 provides a standard for devices implementing a CAN. The standard provides a signaling specification that leaves room for selective message filtering with negligible impact on the normal operation of the bus. The filter as described herein is a physical device that can be implemented as an alternative to a standard CAN transceiver IC; it can be used to implement a CAN bus repeater or bridge with bidirectional filtering capability; it can also be implemented as a wiring-harness adapter or specialized wiring harness to retrofit existing modules that use a CAN interface. The embodiments described herein can be extended to other broadcast bus technologies.

A filter according to certain embodiments may determine the directionality of messages on the shared bus while maintaining transparent operation from a timing perspective. There can be two sides of a filter, respectively referred to as a "filtered" side and an "unfiltered" side. The "filtered" side can be a side of the filter-device after filtering has been applied to any traffic generated by misbehaving devices on the "unfiltered" side. This filtering may take the form of error generation or logical/electrical isolation. The "unfiltered" side can be a side of the device that is effectively untrusted, and can be the side with a misbehaving device, although potentially there may also be other misbehaving devices in the system. Error frames may be intentionally generated on the "unfiltered" side by the filter device to suppress unauthorized messages. Error frames can also be generated on the filtered side in order to prevent ECUs on the filtered side from accepting a partial frame being sent from the unfiltered side. The system can stop the frame transfer in the middle of the frame once an issue has been recognized. The idea of "directionality" in this context may refer to the ability to detect whether a message originates on the filtered or unfiltered side of the device. The idea of "transparent" herein can refer to the idea that unless the traffic is disallowed by the filter specification, the system, i.e. properly behaving devices, may be unaware of the presence of the filter. The impact on signaling and timing may be within the noise margin for the bus.

Figure 2:
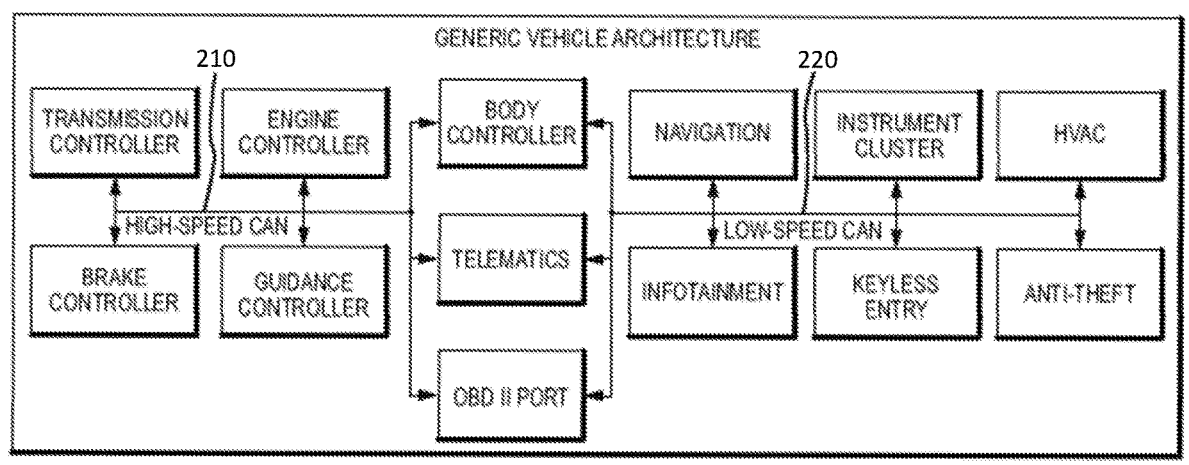
FIG. 2 illustrates an example of a CAN bus vehicle architecture.

FIG. 2 illustrates an example of a CAN bus vehicle architecture. Vehicles' internal communication networks often include multiple CAN buses. As shown in FIG. 2, for example, there may be a high-speed CAN bus 210 and a low-speed CAN bus 220 with multiple devices capable of bridging communications between the two buses. A filter according to certain embodiments could be used by one or more of the devices on either or both of the CAN buses in order to filter the traffic to or from that device.

The high-level depiction of a vehicle architecture in FIG. 2 is presented to establish an example context for the subsequent description of certain embodiments of the present invention. Vehicles typically comprise multiple distinct CAN buses that may or may not be bridged depending on the application. As shown in FIG. 2, many ECUs may be connected to one of two or more buses, such as a high-speed CAN bus or a low-speed CAN bus. These independent buses may be bridged together using other ECUs, for example a body controller. Some of the ECUs may be more susceptible to attack than others and may be in greater need of additional security. For example, any remotely accessible, for example Internet-connected, ECU may be a target for exploitation.

Figure 3:
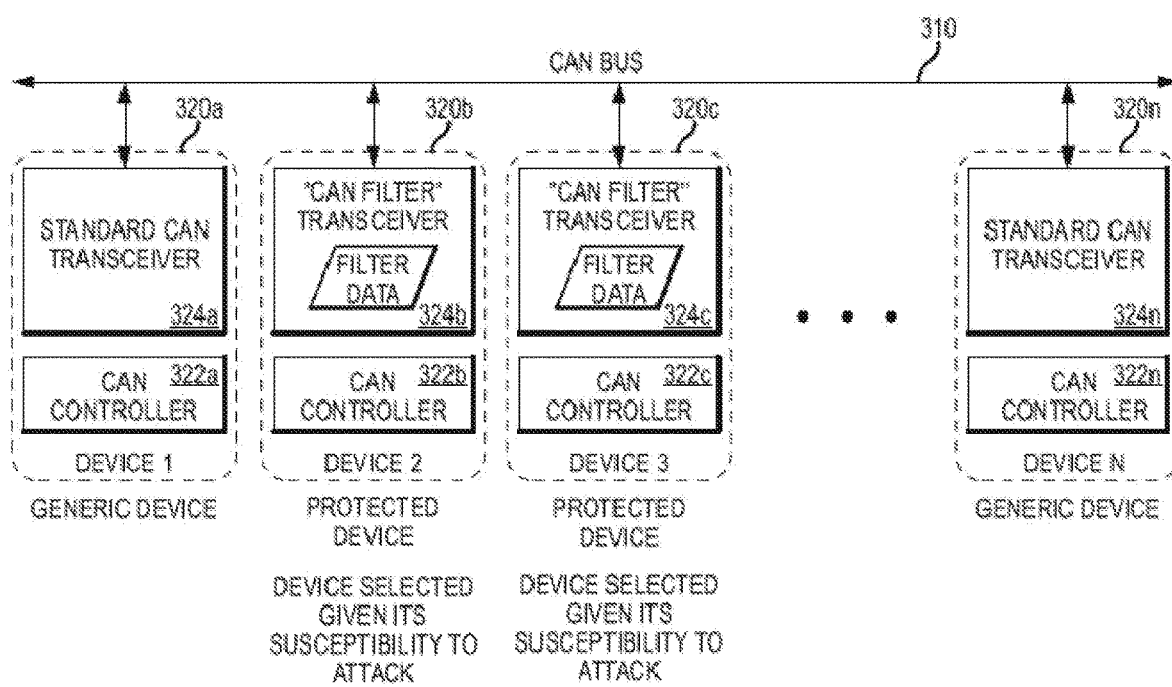
FIG. 3 illustrates a CAN bus including CAN filter transceivers, according to certain embodiments of the present invention.

FIG. 3 illustrates a CAN bus including CAN filter transceivers, according to certain embodiments of the present invention. As shown, certain devices may include a CAN filter transceiver, whereas other devices may have standard CAN transceivers. A device may be selected for having a CAN filter transceiver based on its perceived likelihood of being compromised. For example, a remotely accessible infotainment device may be a target for the CAN filter.

Thus, FIG. 3 provides an abstract representation of several ECUs 320a, 320b, 320c . . . 320n connected to a single CAN bus 310. In this representation, all ECUs contain internal CAN controllers 322a, 322b, 322c . . . 322n. These controllers can be included within microcontrollers or other integrated circuits (ICs). The internal CAN controllers can be, in turn, connected to transceivers 324a, 324b, 324c . . . 324n to convert the digital controller-based signaling to the physical signaling of the differential bus.

In FIG. 3, device 2 (ECU 320b) is identified as an ECU in need of protection. For device 2, the CAN filter transceiver can be used as a substitute for a generic transceiver and can filter the traffic from the ECU's CAN controller. While only two devices, 320b and 320c, are shown with the CAN filter transceiver, any number of devices can use the CAN filter transceiver in place of a standard CAN transceiver.

Figure 4:
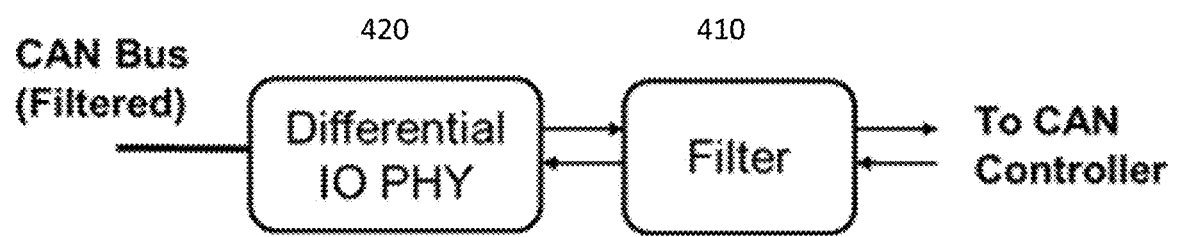
FIG. 4 illustrates a CAN filter transceiver logical view, according to certain embodiments of the present invention.
Figure 7:
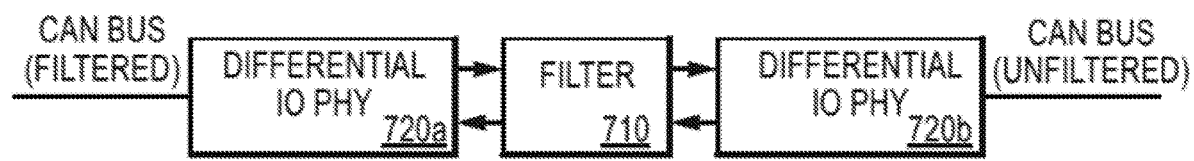
FIG. 7 illustrates an alternative approach for CAN filtering, according to certain embodiments of the present invention.

FIG. 4 and FIG. 7 illustrate two example devices that can be used to perform transparent filtering of a CAN bus. For example, FIG. 4 illustrates a CAN filter transceiver logical view, according to certain embodiments of the present invention. The CAN filter transceiver can act as a replacement for an existing transceiver used to translate digital traffic from a CAN controller to the differential signaling of the CAN bus. The CAN filter transceiver, as a result, can include a filter block 410, comprising a filtering logic that applies to the signals from the CAN controller and a differential transceiver 420 that translates the filtered signals to the CAN bus.

As shown in FIG. 4, a CAN controller, embedded in some external device such as a microcontroller, can be connected bi-directionally to a filtering block 410 of the CAN filter transceiver with a transmit and receive signal. The filtering block 410 can perform the necessary filtering, discussed below, and subsequently can communicate with a physical interface block 420 of the CAN filter transceiver to provide differential signaling in compliance with external system CAN bus requirements. In this view, the device can be a combination of the filtering block and physical interface, such as the CAN filter transceiver described above. A typical implementation may use a modified CAN controller as part of the CAN filter transceiver. A distinction here is that the data received from the physical interface 420 can be filtered by the filter block 410 prior to interaction with the CAN controller.

Figure 5:
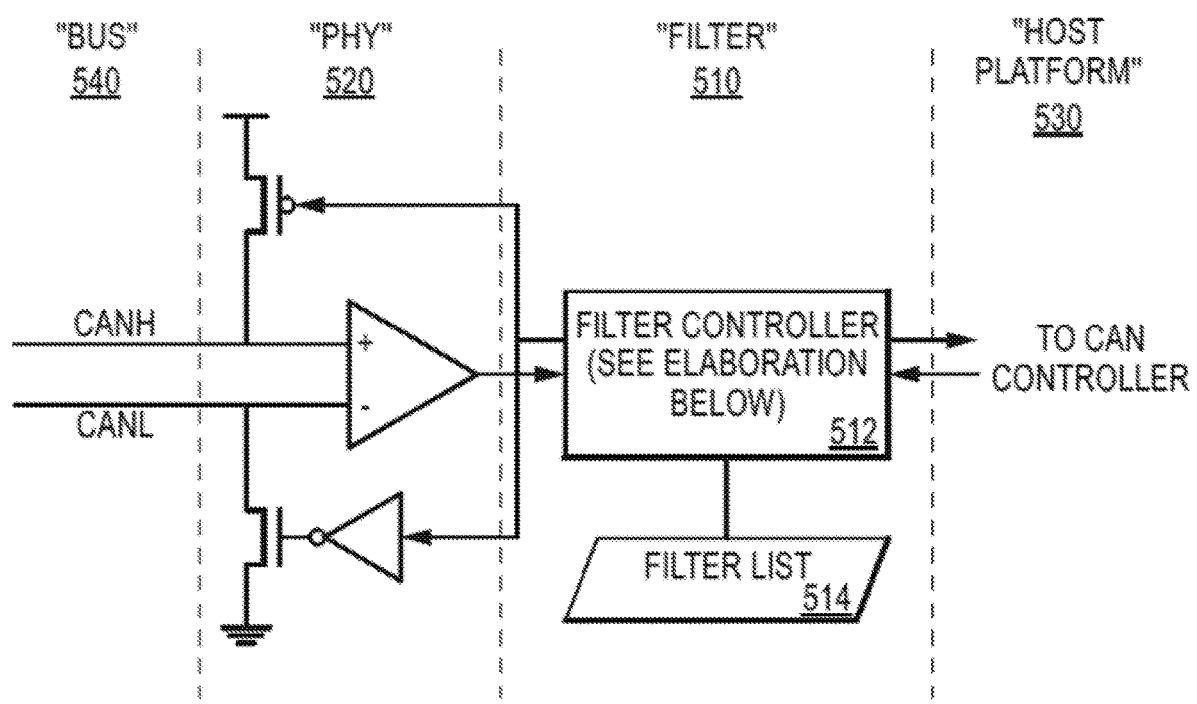
FIG. 5 provides additional detail of the embodiment illustrated in FIG. 4.

FIG. 5 provides additional detail of the embodiment illustrated in FIG. 4. As shown in FIG. 5, the CAN filter transceiver can include the two center columns. The filter block 510 can be a combination of a filter controller 512 and stored filtering data 514 specifying the allowed messages the external CAN controller can send. The rightmost column represents the signaling that may be provided by a host platform 530 on which the CAN filter transceiver has been included, as described above in relation to the protected devices of FIG. 3.

Thus, the filter block 510 can be composed of a filter controller 512 and a collection of data, the filter specification, stored on a memory 514, used to make intelligent decisions on how to filter messages proceeding to, or from, the CAN controller. A generic break-down of the physical interface 520 is further shown to signify that two signals can be passed between the physical interface and the filter block. These same two signals, after filtering, can be exchanged with the CAN controller. The signals can be the CAN transmit signal and the CAN receive signal. The receive signal from the physical interface (PHY) can provide the current data on the external CAN bus 540. The transmit signal to the PHY can be transmitted to the external CAN bus 540. The received and transmitted signals exchanged between the filter block and the CAN controller can be selectively modified as shown in FIG. 6.

Figure 6:
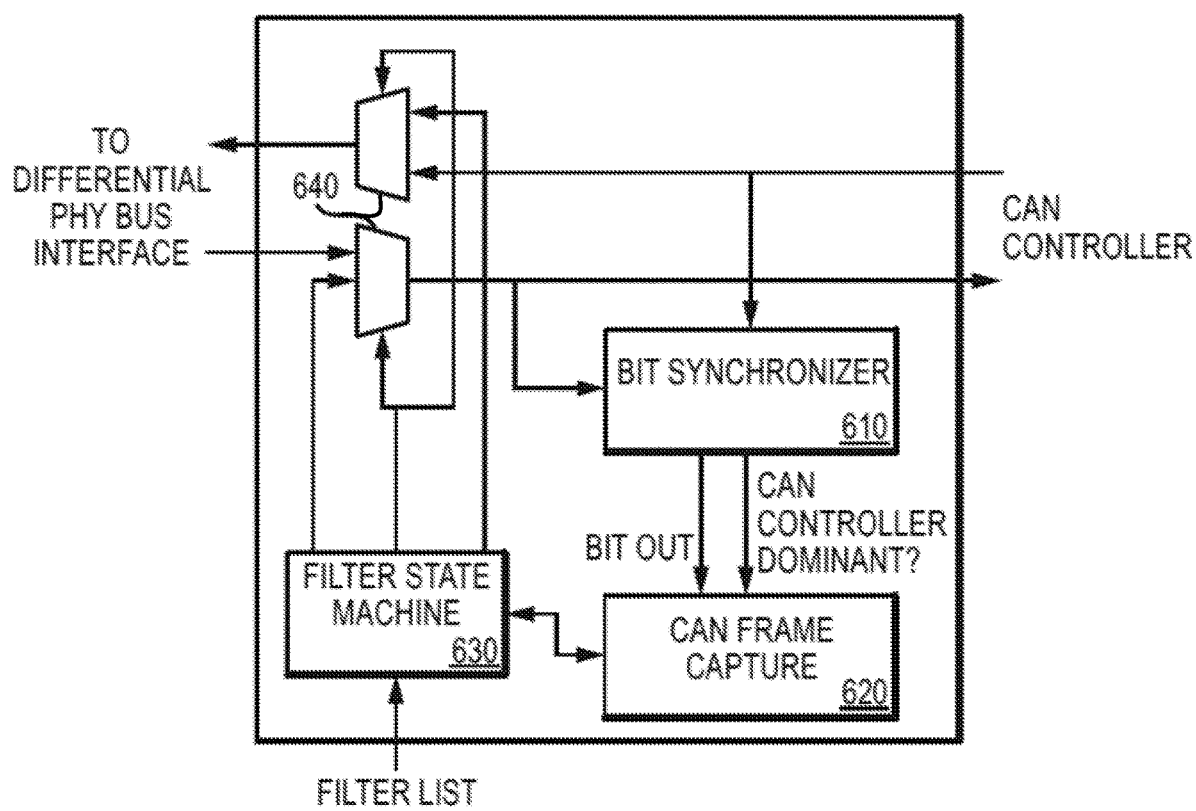
FIG. 6 illustrates detail of a filter controller, according to certain embodiments of the present invention.

FIG. 6 illustrates detail of a filter controller 512, according to certain embodiments of the present invention. The filter controller 512 inside of the filter block 510 can comprise a combination of a customized internal CAN controller, including a bit synchronizer 610 and frame capture unit 620. This customized internal CAN controller can provide input to a filtering state machine 630, which may be separate from the customized internal CAN controller, or incorporated therein, without limitation. The filter state machine 630 can receive data from the frame capture unit 620 and, along with some history of input, can use the data from a received filter list to control multiplexors 640 enabling bus control by the filter block 510. This control can include the generation of error frames to suppress unauthorized traffic from the host platform's CAN controller. There can be different internal constructions that could accomplish the same objective.

As shown in FIG. 6, the default configuration may allow the transmission and reception of signals from the CAN controller. Thus, the filter block 510 can directly connect to the external CAN controller. The signals can pass through a default path of two multiplexors 640, providing transparent operation. For example, there may be no significant bit-time delays on the CAN bus. The signals passing between the external CAN controller and CAN bus can also be provided to a secure isolated customized CAN controller including a bit synchronizer 610 and frame capture block 620 to perform CAN bit timing alignment and CAN frame processing. The captured frame bits can then be provided to a filtering state machine 630, as mentioned above. The state machine 630 can use the frame bits in conjunction with the stored filter list, provided thereto from a memory accessible from the state machine 630, to determine whether to take filtering actions. Based on the determined filter action, the state machine 630 can drive the select-lines of the multiplexors 640, and may also drive a data-input to the multiplexors 640.

The custom CAN controller can include detection circuitry to determine if the external CAN controller or the external CAN bus is dominant. Essentially, the logic can decide if the external CAN controller is in transmit or receive mode in order to determine directionality. This directionality can be used to make intelligent filtering decisions about state machine inputs as driven by the filter data. For example, the filter data accessed from the filter list applicable to transmitted frames may be different from the filter data applicable to received frames.

If the messages being sent by the external CAN controller are permitted by the filter specification, i.e. by the filter data applicable to the messages being transmitted by the external CAN controller, the filter state machine 630 can drive the multiplexor 640 select lines to pass the transmit signal from the external CAN controller through. If the messages are not permitted by the filter specification, the filter state machine 630 can drive the multiplexor select lines to pass the signals provided by the filter state machine 630. When selected as the bus driver, the filter state machine 630 can signal an ERROR frame on the CAN bus to terminate an invalid message. The filter state machine 630 can further electrically isolate the external CAN controller from the bus for a programmable window in order to prevent further ERROR frame generation. The ability to perform this isolation may be advantageous as the default operation for many external CAN controllers may be to retry messages repeatedly on error until success or an error-counter is exceeded. If these errors are sent to the external bus, the other ECUs on the bus may also electrically isolate themselves or otherwise experience degraded performance due to the number of received errors. Removing the misbehaving device from the CAN bus can be a measure to prevent denial of service attacks.

Figure 10:
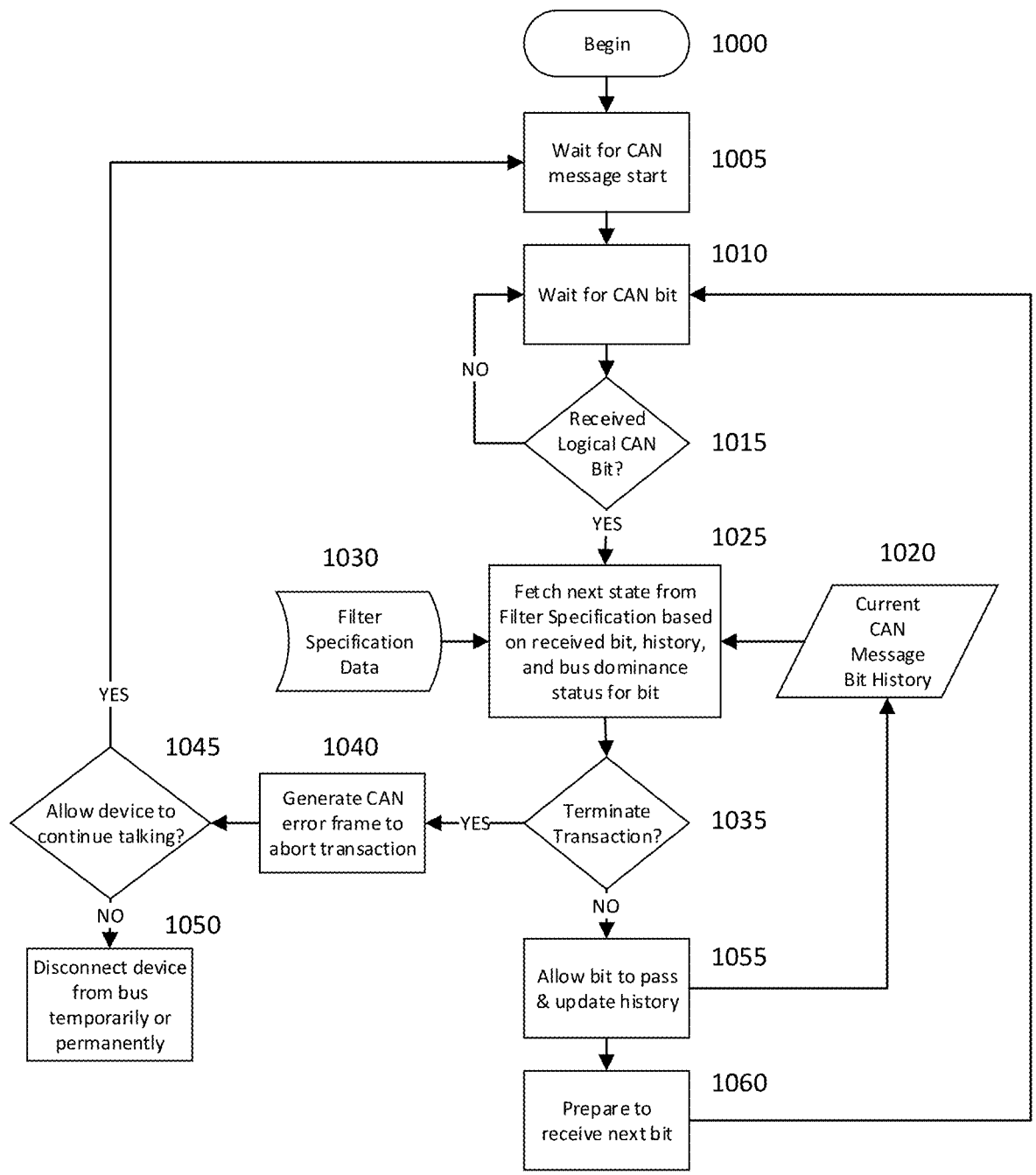
FIG. 10 illustrates a flow diagram for filtering CAN transactions, according to certain embodiments of the present invention.

The filter data/state machine specification utilized by filter state machine 630 can include a simple check of the CAN bus ID, more sophisticated analysis of higher-level CAN protocols messages, and/or also inspection of the internal content of a CAN message including manufacturer specific encodings of the data field. FIG. 10, discussed below, includes a flow-diagram describing the steps involved in processing a CAN message to determine if it is consistent with the filter specification.

Figure 8:
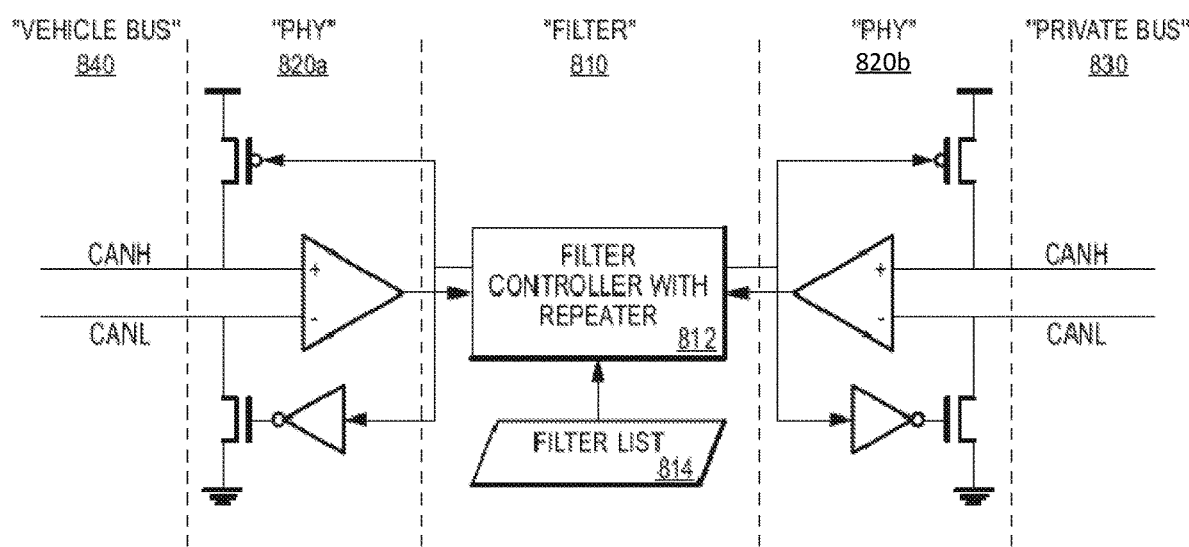
FIG. 8 illustrates additional detail of the embodiment illustrated in FIG. 7.
Figure 9:
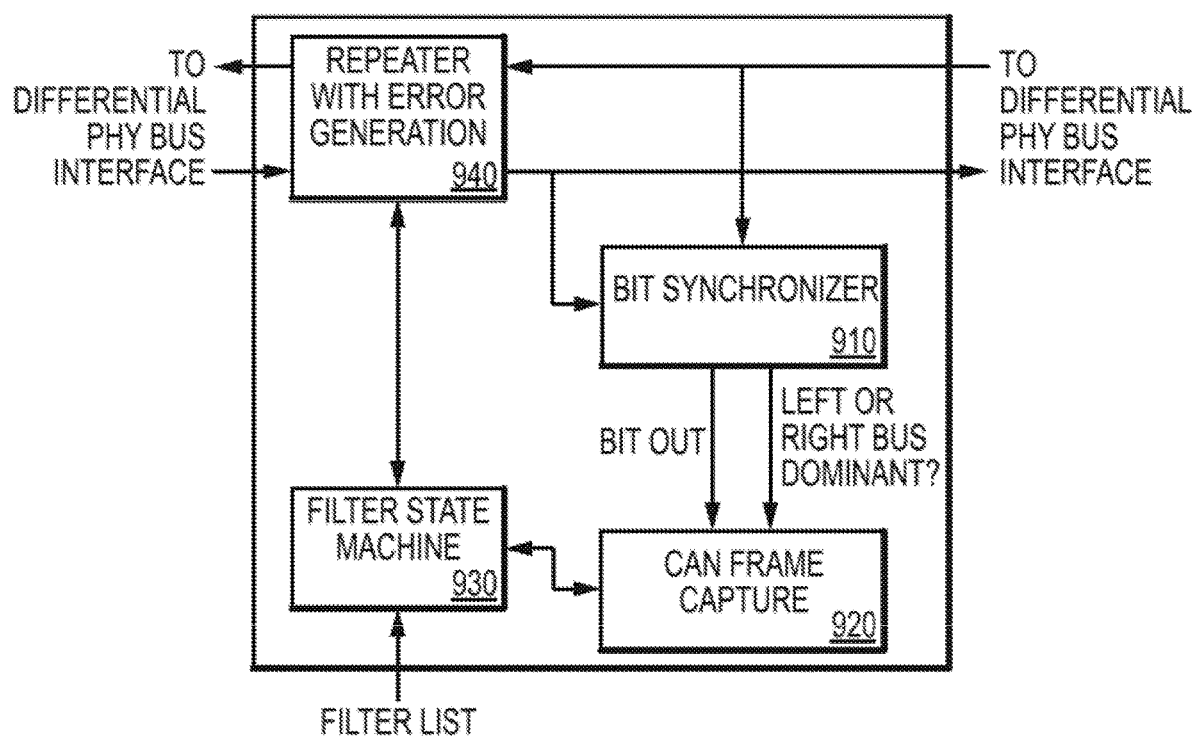
FIG. 9 illustrates a more detailed block diagram of the filter controller with repeater of the filter block of FIG. 8, according to certain embodiments of the present invention.

Shown in FIG. 7, FIG. 8, and FIG. 9 is an alternative approach where the filtering can be accomplished while repeating messages between a filtered and unfiltered CAN bus. Typically a CAN bus connection comprises a contiguous wire pair that CAN modules can connect to in parallel, as opposed to a serial splice. The typical instinct when observing FIG. 8 may be to view the system as a bridge between two distinct CAN buses; however, this is not the case for the configuration shown. Instead, the configuration can take a contiguous CAN bus, and insert repeating logic that transparently, without bridging, maps the differential signaling to digital and back to differential without the system knowing this transformation took place. For example, the timing requirements may still be satisfied.

The mapping to digital signals may allow the filter controller of FIG. 9 to repeat the signals and selectively terminate transactions with electrical isolation based on the directionality information obtained by the filter controller. For example traffic passing from the left of FIG. 9 to the right of FIG. 9 may be allowed while traffic passing in the other direction is not. In this configuration, the device can be inserted into any CAN bus as a repeater that can filter transactions based on a filter specification.

More particularly, FIG. 7 illustrates an alternative approach for CAN filtering with a CAN filter transceiver acting as a transparent CAN filter repeater on a CAN bus, according to certain embodiments of the present invention. The transparent CAN filter repeater can act as an inline unit on a CAN bus. The transparent CAN filter repeater can transparently repeat traffic from an unfiltered side of the bus to a filtered side of the bus. As the traffic is repeated, the CAN filter 710 of the transparent CAN filter repeater can inspect the traffic to ensure the messages sent by the unfiltered side of the bus are authorized to reach the filtered side of the bus. Two transceivers 720*a*, 720*b* may be used to perform the translation to and from digital CAN signals for processing.

FIG. 8 illustrates additional detail of the embodiment illustrated in FIG. 7. As can be seen from FIG. 8, the design may be similar to that shown in FIG. 5, with the addition of an additional transceiver. Additionally the filter controller of FIG. 5 is replaced with a filter controller with repeater. Thus, the device shown in FIG. 8 can include a filter block 810 having a filter controller 812 and a filter list stored in memory 814. The filter can be provided between two transceivers 820a and 820b. The first transceiver 820a can connect to vehicle bus 840, whereas the second transceiver 820b can connect to private bus 830.

FIG. 9 illustrates a more detailed block diagram of the filter controller with repeater 812 of the filter block 810 of FIG. 8, according to certain embodiments of the present invention. This configuration is very similar to that of FIG. 6 in that it can include a bit synchronizer 910, CAN frame capture unit 920, and filter state machine 930. However, the multiplexors can be replaced with a repeater 940, which can include logic configured to repeat digital CAN signals from one side of the repeater to the other while facilitating the termination of unauthorized traffic from the unfiltered side of the bus. The repeater 940 can provide notification for which side of the bus had dominant control.

FIG. 10 illustrates a flow diagram for filtering CAN transactions, according to certain embodiments of the present invention. The method can begin at 1000. At 1005, the CAN filter can wait for a message to start. More particularly, the CAN filter can wait for each CAN bit, at 1010. The CAN filter can receive, at 1015, each bit of a given CAN message along with an indicator for who was dominant on the bus, for example whether the device's associated CAN controller or the bus proper, i.e. another CAN controller on the bus, was dominant. Based on this information, along with some collection of information from previously received bits 1020 for the message, the filter can determine 1025 the location within the filter specification data 1030 from which to fetch the next state and corresponding action that should be taken. Based on this action, the filter may dynamically terminate 1035 the in-progress transaction by generating an error frame on the CAN bus at 1040. The filter can also, at 1045, decide whether device is to continue talking and if not, can disconnect the device from the CAN bus temporarily or permanently at 1050. The filter can update internal state variables for future processing. If no action is needed, the filter can update the received bit history at 1055 and, at 1060, prepare/wait to receive the next bit proceeding back to 1010.

The CAN filter transceiver, as described herein, can be augmented with an additional feature to provide a complete CAN-bus security solution. For example, if the CAN filter transceiver also acts as an ECU, the device can be used as a secure gateway for legitimate-but-dangerous messages. Consider a hypothetical ECU that receives over-the-air firmware updates for other ECUs on the CAN bus. Firmware updates, by their very nature, offer complete control over the destination ECU. In an over-the-air context, the legitimate sender of firmware-update CAN messages may be network connected, and therefore vulnerable to cyberattacks. In this context, the CAN-filter described in preceding sections may be unable to help. However, if the firmware update messages are cryptographically signed by the ECU manufacturer, and are instead directed to the CAN filter transceiver acting as a gateway ECU, the gateway ECU may be able to verify the signature and forward validated firmware-update messages on to the target ECU. Since a cyber-actor may be unable to forge valid signatures, a potentially dangerous pathway into the system can be secured.

This addition to the filter device may allow a signed-update mechanism to be put in place without any changes to the existing ECUs on the bus.

It is possible to implement similar functionality as a bridge between CAN buses. For example the functionality could be implemented between two independent buses, where messages from one are buffered until the other is idle. Disadvantageously, this may yield a more complicated device, and may impact the overall system architecture/requirements, however in certain vulnerable systems it may be desirable despite such limitations.

The specific detail of the filter controller in any approach can be implemented using a number of design approaches while still maintaining the described functionality. For example, the filter detection logic can be implemented in a number of ways including a finite state machine in hardware, as shown in the figures, or through processing logic in software. These and other implementations are permitted. As noted above, certain embodiments may implement filtering in a secure isolated transceiver so that a host controller compromise will not compromise the transceiver implementation.

The filter data/specification has not been described with additional detail beyond that set forth above. The implementation of this specification may be dependent on the design of the detection logic. However, the filter specification may be secured via cryptographic techniques such as authentication, in order to provide security to the filter selection and to enable in-the-field updates of the filter specification. In the event of state-machine based processing, the filter specification can describe state transitions based on the input state provided to the controller, which may include information such as directionality and the present synchronized data value on the bus.

The discussion above has focused heavily on providing filtering for CAN based systems. However, this approach is applicable to other broadcast bus systems, including single master bus systems such as those defined by MIL-STD-1553 as well as to point-to-point technologies. Certain embodiments can provide selective filtering of messages received from an interface in order to ensure they are compliant with the specification for that interface. While MIL-STD-1553 specifies an architecture with a master that configures connections between devices on the bus, all devices can share the same wires/bus. Thus, a misbehaving device can act like a master and violate the established rules thereby becoming a multi-master broadcast bus.

Figure 11:
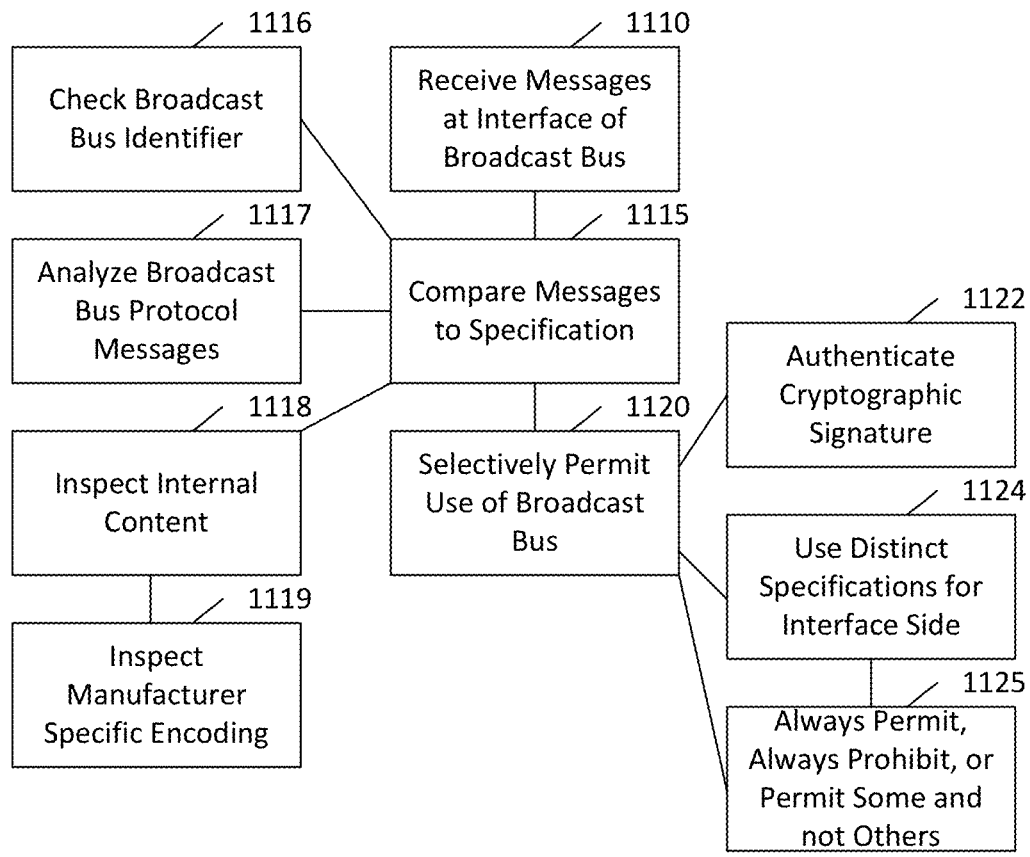
FIG. 11 illustrates a method according to certain embodiments of the present invention.

FIG. 11 illustrates a method according to certain embodiments of the present invention. As shown in FIG. 11, a method can include, at 1110, receiving a plurality of messages at an interface with a broadcast bus of a communication network for a system. The method can also include, at 1120, selectively permitting the plurality of messages to be conveyed through the interface based on, at 1115, comparing one or more of the plurality of messages to a specification for the interface. The communications network can be or include one or more controller area network or other broadcast bus network.

The plurality of messages to be compared to the specification can be received from a controller area network controller with capabilities to communicate external to the system. The messages to be compared to the specification may originate external to the system. For example, the messages to be compared to the specification may originate from a cellular modem device directly connected to the bus, or a device inserted into a diagnostics port of a vehicle.

The messages to be compared to the specification may originate from a controller within the system in response to commands from a source external to the system. For example, the commands may originate from an OnStar® system provided by OnStar Corporation, a subsidiary of General Motors. Alternatively, the messages to be compared to the specification may originate from a controller within the system due to exploitation of cybersecurity/application security vulnerabilities. The vulnerabilities may be in software, firmware, hardware, access control policy, or any combination thereof.

The messages to be compared to the specification may originate from a controller within the system due to implementation errors in the controller. Alternatively, the messages to be compared to the specification may originate from correct operation of a controller, but may implement behaviors that are to be disabled in the system.

The system can be a vehicle. The method can be implemented in a filter transceiver associated with a broadcast bus controller. Alternatively, the method can be implemented at a device interposed between the transceiver of a broadcast bus controller and the broadcast bus. The method can be implemented at each of a plurality of ECUs of the system. For example, the method can be implemented at two or more ECUs in a vehicle.

The comparing of stage 1115 can include checking a broadcast bus identifier at 1116. The comparing can also or additionally include other analysis, such as an analysis of broadcast bus protocol messages at 1117 and/or inspection of internal content of at least one broadcast bus message at 1118. For example, the comparing can include, at 1119, inspection of internal content of a manufacturer specific encoding of a data field of the at least one broadcast bus message.

The selectively permitting of stage 1120 can be based on authenticating, at 1122, a cryptographic signature associated with at least one of the plurality of messages.

In certain embodiments, the method may introduce only negligible impact to the timing of message propagation. In this case, negligible can refer to each bit of the message being analyzed and selectively transmitted within the same bus clock cycle as it was received, such that the impact of the filter method may fall within an acceptable margin of error for the bus clock. Thus, for example, the bit can be transmitted transparently in the system. If this bit causes a message to be flagged as invalid then the filter can invalidate the frame. Within a bit-time, the filter may not be able to both determine that a bit causes the message-in-progress to violate the filter specification and invalidate the frame by altering the current bit. The alteration, therefore, can happen at the next bit-time. The alteration at a latter bit-time may be performed prior to the end of a frame transfer, thereby preventing the frame from being accepted by the system. If no alterations occur, the frame transfer behaves as it would during normal operation, i.e. the filtering is transparent to the system.

The selectively permitting can, at 1124, use distinct specifications for the comparing based on the side of the interface from which the message is received. The side can refer to the broadcast bus side or the controller side, though certain embodiments can alternatively be used to filter between two buses or between two controllers in a point-to-point configuration.

The specification can be configured, at 1125, to at least one setting of the following: always permitting messages, always prohibiting messages, or permitting some messages and prohibiting other messages.

Figure 12:
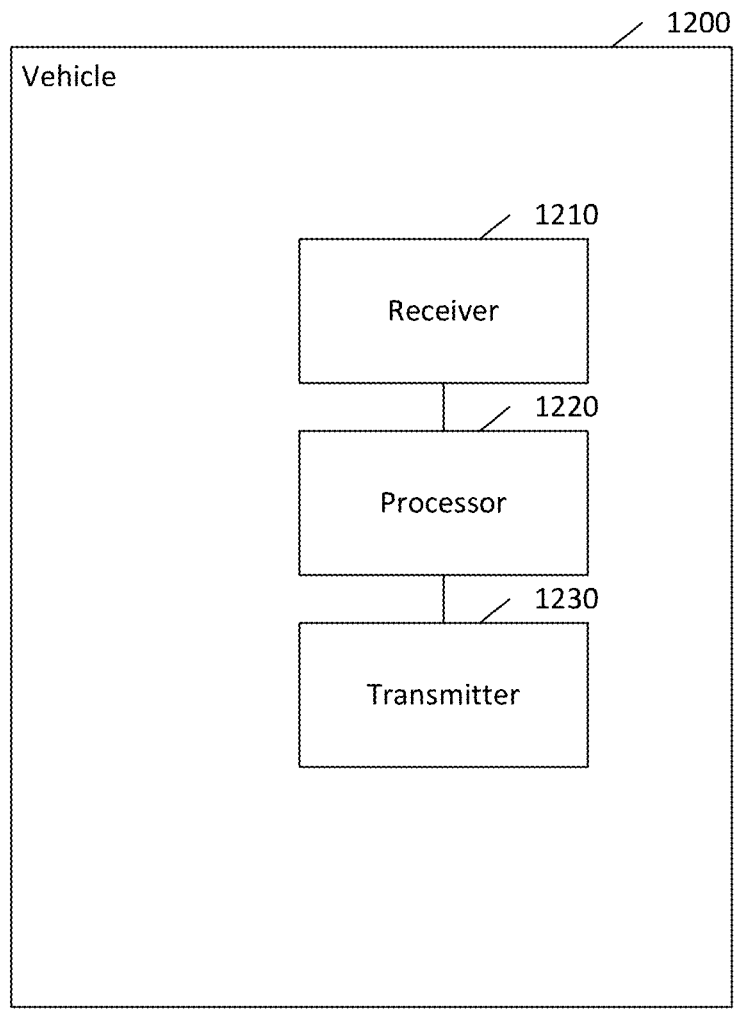
FIG. 12 illustrates an apparatus according to certain embodiments of the present invention.

FIG. 12 illustrates an apparatus according to certain embodiments of the present invention. As shown in FIG. 12, an apparatus can include a receiver 1210 configured to receive a plurality of messages at an interface with a provided broadcast bus of a provided communication network for a provided system. The apparatus can also include a processor 1220 configured to perform a comparison of one or more of the plurality of messages to a specification for the interface. The apparatus can further include a transmitter 1230 configured to selectively forward the plurality of messages through the interface based on the comparison.

The receiver 1210 and transmitter 1230 can be implemented in various ways, such as by the arrangements shown in FIGS. 4-9. Alternatively, other forms of hardware receivers or transmitters can be employed, as desired. Similarly, the processor 1220 can be implemented by any microprocessor, integrated circuit, digital logic circuit, or the like. Moreover, the processor 1220 can be configured to operate in accordance with the flows illustrated in FIGS. 10 and 11.

As shown in FIG. 12, the apparatus may be included in a vehicle 1200. For example, the apparatus may be placed at an interface of one or more ECU connected to a CAN in the vehicle.

Certain embodiments may have various benefits and/or advantages. For example, a filter can determine the directionality of messages on the shared bus while maintaining transparent operation from a timing perspective.

The filter can electrically and logically isolate a misbehaving device or compromised bus from the rest of the system. This may prevent unnecessary generation of error-frames which can negatively affect other devices on the bus.

The use of secure isolated filtering may prevent a successful exploit against an ECU from being able to modify the filter specification. As mentioned above, isolated filtering can refer to filtering by a device that is independent from the primary ECU functionality, such that changes to the ECU do not effect changes in the filter-device. This may make a fielded filter-device secure from future network based attacks on the ECU.

Filters according to certain embodiments may be applied to any CAN system. For example, such filters may be designed to filter based on an international standard.

A CAN filter, according to certain embodiments, can be integrated into an ECU on a per-ECU basis without requiring changes to other CAN devices. Thus, in certain cases, the integration may only involve a single ECU and not the rest of the system. This may help to avoid system-level architecture changes. Moreover, generating the filter specification may only require knowledge of the specific ECU into which it is integrated. This contrasts with a CAN bus monitoring approach, where the monitor may need to be aware of the messages for all devices on the bus. Alternatively, the CAN filter transceiver can be applied externally to specific ECUs in a vendor-independent manner. In such a case, there may be no ECU changes, but simply, for example, a serial hardware insertion.

For example, it is possible to use a filter transceiver to retrofit existing ECUs via a transparent interposer. This interposer may essentially be an inline plug-in module for a cable harness/connector. The term "transparent" here may not refer to the optical properties of the interposer but to the fact that the system need not be informed of the presence of the device, but can continue to operate as though the device were not present.

The filter specification may be programmable so that an ECU manufacturer can specify the CAN messages and other information necessary to perform intelligent filtering for a specific ECU or collection of ECUs.

Additionally, the filter specification can be cryptographically signed in order to ensure a malicious adversary cannot forge the filter specification and allow malicious traffic to pass through the device. The signature-verification key can be programmable to facilitate restricting filter specifications to specific filter devices.

Furthermore, in certain embodiments, devices communicating on the bus may operate while having no knowledge that the filtering action performed by certain embodiments is taking place. In certain embodiments, a method can be performed within a message frame such that disallowed messages are invalidated and thereby kept from being accepted at an endpoint on the broadcast bus. The invalidation of messages may be accomplished with global bus errors. If a filtered ECU repeatedly sends disallowed messages, devices on the bus may eventually enter a fail-safe error mode due to the large number of global errors generated by the filter-device. However, the filter-device may provide the ability to isolate the compromised ECU from the system and thereby prevent any subsequent disallowed messages sent by the ECU from ever reaching the bus, hence eliminating the need to generate global bus errors.

There are multiple possibilities for the filter specification. For example, the filtering can be performed simply based on the ID field of the CAN message. Alternatively, the filtering can be performed in a packet-inspection manner, whereby the data within the messages is inspected to check for validity. Additionally, the frequency of messages can be inspected to determine whether an unexpected proportion of the bus throughput is being consumed by high-priority messages originating from the unfiltered side of the filter device.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    receiving a plurality of messages at an interface with a broadcast bus of a communication network for a system, said broadcast bus having a broadcast bus clock;
    selectively permitting the plurality of messages to be conveyed through the interface based on comparing one or more of the plurality of messages to a specification for the interface, wherein the selectively permitting is performed on a bit-by-bit basis, wherein the selectively permitting comprises conveying through the interface a first bit of a given message before analyzing a subsequent bit of the given message,
    wherein the method is implemented in a network controller of a device on the communication network and wherein the device is a selected ECU of a plurality of ECUs of the system, and
    wherein the selectively permitting is transparent such that an impact on timing of message propagation on the broadcast bus is negligible so as to fall within an acceptable margin of error for the broadcast bus clock.

2. The method of claim 1, wherein the communications network comprises a controller area network.

3. The method of claim 1, wherein the plurality of messages are received from a controller area network controller with capabilities to communicate external to the system.

4. The method of claim 3, wherein the received plurality of messages originate external to the system.

5. The method of claim 3, wherein the received plurality of messages originate from a controller within the system in response to commands from a source external to the system.

6. The method of claim 1, wherein the system comprises a vehicle.

7. The method of claim 1, wherein the comparing comprises checking a broadcast bus identifier.

8. The method of claim 1, wherein the comparing comprises an analysis of broadcast bus protocol messages.

9. The method of claim 1, wherein the comparing comprises inspection of internal content of at least one broadcast bus message.

10. The method of claim 9, wherein the comparing comprises inspection of internal content of a manufacturer specific encoding of a data field of the at least one broadcast bus message.

11. The method of claim 1, wherein the selectively permitting is based on authenticating a cryptographic signature associated with at least one of the received plurality of messages.

12. The method of claim 1, wherein, for a message of the plurality of messages, each bit of the message arriving at the interface is conditionally conveyed through the interface before arrival of a subsequent bit of the message at the interface.

13. The method of claim 1, wherein each bit of the plurality of messages that is permitted is transmitted through the interface within a same bit time that the bit was received at the interface.

14. The method of claim 1, wherein the interface with a network comprises an interface with a broadcast bus and the network controller comprises a broadcast bus controller.

15. A method, comprising:
    receiving a plurality of messages at an interface with a broadcast bus of a communication network for a system, said broadcast bus having a broadcast bus clock; and
    with a device, selectively permitting the plurality of messages to be conveyed through the interface based on comparing one or more of the plurality of messages to a specification for the interface, wherein the selectively permitting is performed on a bit-by-bit basis, wherein the selectively permitting comprises conveying though through the interface a first bit of a given message before analyzing a subsequent bit of the given message wherein the selectively permitting uses distinct specifications for the comparing based on the side of the interface from which the message is received; and
    wherein the device is a selected ECU of a plurality of ECUs of the system, and
    wherein the selectively permitting is transparent such that an impact on timing of message propagation on the broadcast bus is negligible so as to fall within an acceptable margin of error for the broadcast bus clock.

16. The method of claim 1, wherein the specification is configured to at least one setting selected from always permitting messages, always prohibiting messages, or permitting some messages and prohibiting other messages.

17. An apparatus, comprising:
    a receiver configured to receive a plurality of messages at an interface with a provided broadcast bus of a provided communication network for a provided system, said broadcast bus having a broadcast bus clock;
    a processor configured to perform a comparison of one or more of the plurality of messages to a specification for the interface; and a transmitter configured to selectively forward the plurality of messages through the interface based on the comparison wherein the selectively forwarding is performed on a bit-by-bit basis, wherein the selectively permitting comprises conveying through the interface a first bit of a given message before analyzing a subsequent bit of the given message;

wherein the receiver, processor, and transmitter are implemented in a broadcast bus controller;

wherein the apparatus is an ECU; and wherein the selectively forwarding is transparent such that an impact on timing of message propagation on the broadcast bus is negligible so as to fall within an acceptable margin of error for the broadcast bus clock.

18. The apparatus of claim 17, wherein the communications network comprises a controller area network.

19. The apparatus of claim 17, wherein the plurality of messages are received from a controller area network controller with capabilities to communicate external to the system.

20. The apparatus of claim 19, wherein the received plurality of messages originate external to the system.

21. The apparatus of claim 19, wherein the received plurality of messages originate from a controller within the system in response to commands from a source external to the system.

22. The apparatus of claim 17, wherein the system comprises a vehicle.

23. The apparatus of claim 17, wherein the processor is configured to check a broadcast bus identifier in performing the comparison.

24. The apparatus of claim 17, wherein the processor is configured to analyze broadcast bus protocol messages in performing the comparison.

25. The apparatus of claim 17, wherein the processor is configured to inspect internal content of at least one broadcast bus message in performing the comparison.

26. The apparatus of claim 25, wherein the processor is configured to inspect a manufacturer specific encoding of a data field of the at least one broadcast bus message in performing the inspection of the internal content.

27. The apparatus of claim 17, wherein the processor is configured to selectively permit based on authenticating a cryptographic signature associated with at least one of the received plurality of messages.

28. The apparatus of claim 17, wherein the processor is configured to use distinct specifications for the comparison based on the side of the interface from which the message is received.

29. The apparatus of claim 17, wherein the specification is configured to at least one setting selected from always permitting messages, always prohibiting messages, or permitting some messages and prohibiting other messages.

* * * * *